(12) United States Patent
Nakamura et al.

(10) Patent No.: US 11,269,626 B2
(45) Date of Patent: Mar. 8, 2022

(54) QUALITY ANALYSIS OF SOURCE CODE

(71) Applicant: INTERNATIONAL BUSINESS MACHINES CORPORATION, Armonk, NY (US)

(72) Inventors: Hiroaki Nakamura, Kanagawa-ken (JP); Toshiaki Yasue, Kanagawa-ken (JP); Kohichi Ono, Tokyo (JP); Alisa Ooka, Saitama (JP); Nobuhiro Hosokawa, Kanagawa (JP); Yukiko Hara, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 16/856,461

(22) Filed: Apr. 23, 2020

(65) Prior Publication Data
US 2021/0334095 A1  Oct. 28, 2021

(51) Int. Cl.
*G06F 8/75* (2018.01)
*G06N 20/00* (2019.01)

(52) U.S. Cl.
CPC .............. *G06F 8/75* (2013.01); *G06N 20/00* (2019.01)

(58) Field of Classification Search
CPC .................................. G06F 8/75; G06N 20/20
USPC ................................................. 717/120–167
See application file for complete search history.

(56) References Cited

U.S. PATENT DOCUMENTS

| | | | |
|---|---|---|---|
| 9,274,924 B2 | 3/2016 | Hentschel et al. | |
| 9,454,347 B2 | 9/2016 | Yoshida | |
| 10,180,836 B1* | 1/2019 | Arguelles | G06F 8/73 |
| 10,353,703 B1 | 7/2019 | Sloyan et al. | |
| 10,387,553 B2 | 8/2019 | Cox et al. | |
| 2007/0234319 A1* | 10/2007 | Matsutsuka | G06F 8/74 717/140 |
| 2018/0267883 A1* | 9/2018 | Tezuka | G06F 11/3608 |
| 2018/0373507 A1* | 12/2018 | Mizrahi | G06F 8/36 |
| 2020/0097261 A1* | 3/2020 | Smith | G06N 3/0454 |

OTHER PUBLICATIONS

Chandra, Kanika, et al. "Improving software quality using machine learning." 2016 international conference on innovation and challenges in cyber security (ICICCS-INBUSH). IEEE, 2016.pp.115-118 (Year: 2016).*

(Continued)

*Primary Examiner* — Satish Rampuria
(74) *Attorney, Agent, or Firm* — Tutunjian & Bitetto, P.C.; Joseph Petrokaitis

(57) ABSTRACT

Systems and methods for quality analysis of a source code are disclosed. The method includes obtaining plural comments included in the source code. Each of the plural comments includes at least one of plural predetermined words. Also the method extracts plural candidate comments which are comments obtained by excluding plural specific comments from the obtained plural comments. Each of the plural specific comments can be identified using a similarity between a source code fragment relating to any of the obtained plural comments and an adjacent source code fragment adjacent to the source code fragment. In addition, the method outputs an evaluation about incompletion of the source code. The evaluation is determined using the plural candidate comments.

17 Claims, 8 Drawing Sheets

(56) References Cited

OTHER PUBLICATIONS

Sultanow, Eldar, et al. "Machine learning based static code analysis for software quality assurance." 2018 Thirteenth International Conference on Digital Information Management (ICDIM). IEEE, 2018. pp.156-161 (Year: 2018).*

Castro Lechtaler, Antonio, et al. "Automated analysis of source code patches using machine learning algorithms." XXI Congreso Argentino de Ciencias de la Computación (Jun. 2015). 2015.pp.1-9 (Year: 2015).*

Allamanis, Miltiadis, et al. "A survey of machine learning for big code and naturalness." ACM Computing Surveys (CSUR) 51.4 (2018): pp. 1-37. (Year: 2018).*

Ahadi, Alireza, et al. "Exploring machine learning methods to automatically identify students in need of assistance." Proceedings of the eleventh annual international conference on international computing education research. 2015.pp.121-130 (Year: 2015).*

Rasthofer, Siegfried, Steven Arzt, and Eric Bodden. "A machine-learning approach for classifying and categorizing android sources and sinks." NDSS. vol. 14. 2014.pp. 1-15 (Year: 2014).*

Tan, Lin, et al., "Hotcomments: howto make program comments more useful?" HotOS, May 2007, 6 pages.

Steidl, Daniela, et al., "Quality analysis of source code comments," 2013 21st International Conference on Program Comprehension (ICPC), Ieee, May 2013, pp. 83-92.

* cited by examiner

QUALITY ANALYSIS OF SOURCE CODE

BACKGROUND

The present invention relates to quality analysis of a source code.

In a large-scale software development process, a program statement in a source code can be temporarily left incomplete. The term "incomplete" means that the program statement is described to be compilable but does not achieve a desired function. The ability to identify incomplete program statements in the source code is useful for quality analysis of the source code. There is a need for a method for efficiently identifying the incomplete program statements in the source code.

SUMMARY

According to an embodiment of the present invention, there is provided a computer-implemented method for quality analysis of a source code. The method includes obtaining plural comments included in the source code. Each of the plural comments includes at least one of plural predetermined words. The method includes extracting plural candidate comments which are comments obtained by excluding plural specific comments from the obtained plural comments. Each of the plural specific comments is identified using a similarity between a source code fragment relating to any of the obtained plural comments and an adjacent source code fragment adjacent to the source code fragment. The method includes outputting an evaluation about incompletion of the source code. The evaluation is determined using the plural candidate comments.

According to another embodiment of the present invention, there is provided an apparatus for quality analysis of a source code. The apparatus includes a processor and a memory coupled to the processor. The memory tangibly stores program instructions. The program instructions are executable by the processor to cause the processor to perform the aforementioned method.

According to yet another embodiment of the present invention, there is provided a computer program product for quality analysis of a source code. The computer program product includes a computer readable storage medium having program instructions embodied with the computer readable storage medium. The program instructions are executable by a computer to cause the computer to perform the aforementioned method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures.

DETAILED DESCRIPTION

Hereinafter, exemplary embodiments of the present invention will be described in detail with reference to the attached drawings.

It is to be noted that the present invention is not limited to these exemplary embodiments to be given below and can be implemented with various modifications within the scope of the present invention. In addition, the drawings used herein are for illustrative purposes only, and may not show actual dimensions.

It is empirically known that comments in the source code can indicate that corresponding program statements are incomplete. Analysis of these comments can allow identification of incomplete program statements.

However, analyzing the comments manually, by a user, can require a great deal of effort and can produce different results due to differences in interpretation by users of different skill levels. In view of this, the exemplary embodiments efficiently and accurately identify incomplete program statements by analyzing the comments computationally.

Figure 1:
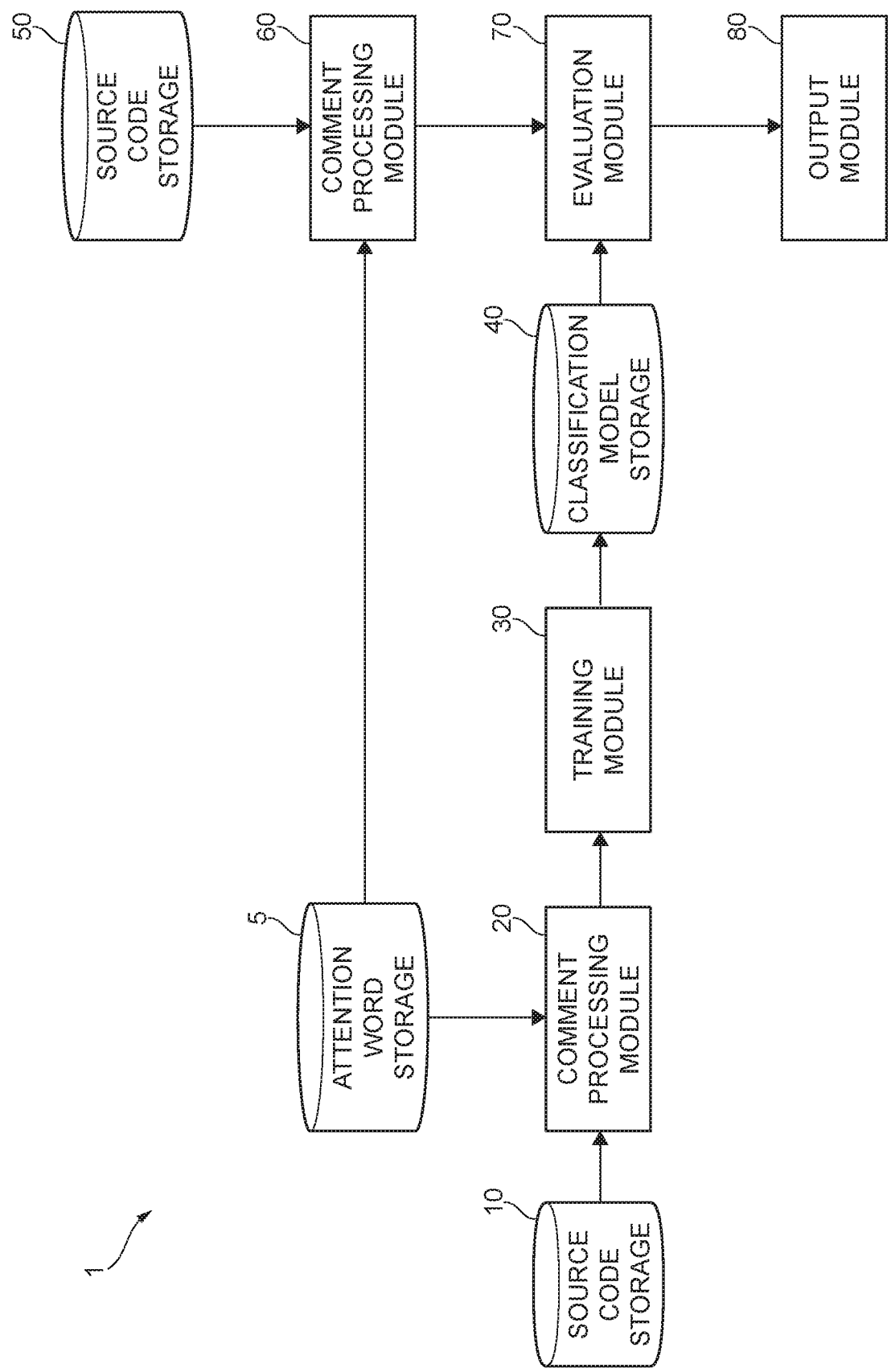
FIG. 1 depicts a block diagram of a software quality analyzing system according to a preferred exemplary embodiment of the present invention.

Referring to FIG. 1, there is shown a block diagram of a machine learning based software quality analyzing system 1 to which a preferred exemplary embodiment is applied. As shown in the figure, the software quality analyzing system 1 can include an attention word storage 5, a source code storage 10, a comment processing module 20, a training module 30, a classification model storage 40, a source code storage 50, a comment processing module 60, an evaluation module 70, and an output module 80.

The attention word storage 5 can store attention words. Each of the attention words is a word which, when included in a comment, can indicate that a corresponding program statement is incomplete. The attention words can include, for example, "temporarily", "pending", "etc.", "so on", "probably", "possibly", "To Do", and "TBD". The attention words can be predetermined. Note that the attention words serve as one example of the claimed predetermined words.

The source code storage 10 can store source code files for training. Note that each of the source code files serves as one example of the claimed source code.

Each of the source code files stored in the source code storage 10 can include plural program statements and plural comments.

The plural program statements can include plural instruction statements and plural declare statements.

Each of the plural comments can be described in an area individually in correspondence with a corresponding program statement. Also, each of the plural comments can explain specifications of the corresponding program statement, or provide a background of why the corresponding program statement has been described. Alternatively, each of the plural comments can be described in an area in correspondence with a set of program statements, and can indicate a change log, a fixed header, a copyright, or the like. In the source code file stored in the source code storage 10, each of the plural comments can be given an incompletion-indicating label. The incompletion-indicating label is a label showing whether or not a comment to which it is given indicates that the corresponding program statement is incomplete.

The comment processing module 20 can perform comment processing on the comments included in the source code files stored in the source code storage 10.

The comment processing module 20 can perform, as the first comment processing, a process to obtain the comments included in the source code files for training stored in the source code storage 10.

The comment processing module 20 can perform, as the second comment processing, a process to extract attention comments including at least one of the attention words stored in the attention word storage 5 from the comments obtained in the first comment processing. Note that the attention comments serve as one example of the claimed plurality of comments, and the second comment processing serves as one example of the claimed obtaining a plurality of comments.

The attention comments can include comments indicating that a corresponding program statement is incomplete (hereinafter referred to as "incompletion-indicating comments") and comments not indicating that a corresponding program statement is incomplete (hereinafter referred to as "incompletion-non-indicating comments"). The incompletion-non-indicating comments can include the first type of incompletion-non-indicating comments (hereinafter referred to as "the first incompletion-non-indicating comments") and the second type of incompletion-non-indicating comments (hereinafter referred to as "the second incompletion-non-indicating comments"). The first incompletion-non-indicating comments are comments to be excluded before training in the training module 30 and evaluation in the evaluation module 70 among the incompletion-non-indicating comments. Meanwhile, the second incompletion-non-indicating comments are comments to be used for training in the training module 30 and evaluation in the evaluation module 70 among the incompletion-non-indicating comments.

The comment processing module 20 can perform, as the third comment processing, a process to extract candidate comments from the attention comments extracted in the second comment processing. The candidate comments are comments obtained by excluding the first incompletion-non-indicating comments from the attention comments. Each of the first incompletion-non-indicating comments can be identified based on a similarity between a source code fragment related to any of the attention comments and an adjacent source code fragment preceding or following the source code fragment. Note that the first incompletion-non-indicating comments serve as one example of the claimed specific comments, and the third comment processing serves as one example of the claimed extracting a plurality of candidate comments.

The source code fragment related to any of the attention comments can be a program statement corresponding to any of the attention comments. In this case, the comment processing module 20 can first calculate similarities $Sim(s_{i-1}, s_i)$ and $Sim(s_i, s_{i+1})$, where $s_i$ represents a program statement corresponding to an attention comment $c_i$, $s_{i-1}$ represents a program statement precedingly adjacent to the program statement $s_i$, $s_{i+1}$ represents a program statement subsequently adjacent to the program statement $s_i$, $Sim(s_{i-1}, s_i)$ represents a similarity between the program statement $s_{i-1}$ and the program statement $s_i$, and $Sim(s_i, s_{i+1})$ represents a similarity between the program statement $s_i$ and the program statement $s_{i+1}$. Specifically, the comment processing module 20 can calculate the similarity $Sim(s_{i-1}, s_i)$ as zero when the types of the program statements $s_{i-1}$ and $s_i$ do not match, and can calculate the similarity $Sim(s_{i-1}, s_i)$ as a ratio of the number of syntax elements common between the program statements $s_{i-1}$ and $s_i$ to the number of syntax elements included in either of the program statements $s_{i-1}$ and $s_i$ when the types of the program statements match. The comment processing module 20 can calculate the similarity $Sim(s_i, s_{i+1})$ as zero when the types of the program statements $s_i$ and $s_{i+1}$ do not match, and can calculate the similarity $Sim(s_i, s_{i+1})$ as a ratio of the number of syntax elements common between the program statements $s_i$ and $s_{i+1}$ to the number of syntax elements included in either of the program statements $s_i$ and $s_{i+1}$ when the types of the program statements match. Note that the types of the program statements can be function call statements, assignment statements, if statements, or the like. Next, the comment processing module 20 can determine the attention comment ci as the first incompletion-non-indicating comment, if it satisfies a condition "$T<\max(Sim(s_{i-1}, s_i), Sim(s_i, s_{i+1}))$", where T represents a predefined threshold value. This is because even if the attention word is included in a comment corresponding to one of the similar program statements described over plural lines, the comment is likely to explain specifications of the corresponding program statement and is unlikely to indicate that the corresponding program statement is incomplete.

Alternatively, the source code fragment related to any of the attention comments can be an attention comment. In this case, the comment processing module 20 can first calculate similarities $Sim(c_{i-1}, c_i)$ and $Sim(c_i, c_{i+1})$, where $c_{i-1}$ represents a comment precedingly adjacent to the attention comment $c_i$, $c_{i+1}$ represents a comment subsequently adjacent to the attention comment $c_i$, $Sim(c_{i-1}, c_i)$ represents a similarity between the comment $c_{i-1}$ and the attention comment $c_i$, and $Sim(ci, c_{i+1})$ represents a similarity between the attention comment $c_i$ and the comment $c_{i+1}$. Specifically, the comment processing module 20 can calculate the similarity $Sim(c_{i-1}, c_i)$ as a ratio of the number of syntax elements common between the attention comments $c_{i-1}$ and $c_i$ to the number of syntax elements included in either of the attention comments $c_{i-1}$ and $c_i$. The comment processing module 20 can calculate the similarity $Sim(ci, c_{i+1})$ as a ratio of the number of syntax elements common between the attention comments $c_i$ and $c_{i+1}$ to the number of syntax elements included in either of the program statements $c_i$ and $c_{i+1}$. Next, the comment processing module 20 can determine the attention comment ci as the first incompletion-non-indicating comment, if it satisfies a condition "$T<\max(Sim(c_{i-1}, c_i), Sim(c_i, c_{i+1}))$", where T represents a predefined threshold value. This is because even if the attention word is included in one of the similar comments described over plural lines, the comment is likely to explain specifications of a corresponding program statement and is unlikely to indicate that the corresponding program statement is incomplete.

The training module 30 can train a classification model to learn a relationship between an appearance tendency of words included in a candidate comment and whether or not the candidate comment indicates that the corresponding program statement is incomplete. The training module 30 can use the above incompletion-indicating label as information on whether or not the candidate comment indicates that the corresponding program statement is incomplete. In other words, the training module 30 can train the classification model to learn a rule for distinguishing between the incompletion-indicating comments and the second incompletion-non-indicating comments. For example, assuming that a naive Bayesian classifier for two classes, namely a class "indicating incompletion" and a class "not indicating incompletion" is used as a classifier based on the classification model, the training module 30 can input, to the naive Bayesian classifier, words included in a candidate comment and an incompletion-indicating label given to the candidate comment. Alternatively, a deep neural network (DNN) or a support vector machine (SVM) can be used as a classifier based on the classification model.

The classification model storage 40 can store the classification model trained by the training module 30 to learn the relationship between an appearance tendency of words included in the candidate comment and whether or not the candidate comment indicates that the corresponding program statement is incomplete.

The source code storage 50 can store source code files to be evaluated. The source code files stored in the source code storage 50 can be the same as the source code files stored in the source code storage 10, except that no incompletion-indicating label is given to any comments.

The comment processing module 60 can be the same as the comment processing module 20, except that it performs, as the first comment processing, processing to obtain the comments included in the source code files to be evaluated stored in the source code storage 50. That is, the comment processing module 60 can perform, as the second comment process, processing to extract attention comments including at least one of the attention words stored in the attention word storage 5 from the comments obtained in the first comment processing. The comment processing module 60 can perform, as the third comment processing, processing to extract candidate comments from the attention comments extracted in the second comment processing.

The evaluation module 70 can determine incompletion-indicating evaluation values each regarding whether or not a candidate comment extracted by the comment processing module 60 indicates that a corresponding program statement is incomplete. That is, the evaluation module 70 can give the lowest value to all comments determined to be the first incompletion-non-indicating comments, as an incompletion-indicating evaluation value. Meanwhile, the evaluation module 70 can determine an incompletion-indicating evaluation value for each of the candidate comments, namely the comments not determined to be the first incompletion-non-indicating comments. Specifically, the evaluation module 70 can input words in the candidate comment to the classification model stored in the classification model storage 40, obtain output information on whether or not the candidate comment indicates that the corresponding program statement is incomplete, and determine the incompletion-indicating evaluation value using the output information. For example, the evaluation module 70 can determine the incompletion-indicating evaluation value as a high value when the output information indicates that the candidate comment is highly likely to indicate incompletion of the corresponding program statement. Meanwhile, the evaluation module 70 can determine the incompletion-indicating evaluation value as a low value when the output information indicates that the candidate comment is unlikely to indicate incompletion of the corresponding program statement. In other words, the evaluation module 70 can calculate the incompletion-indicating evaluation values for distinguishing between the incompletion-indicating comments and the second incompletion-non-indicating comments.

The output module 80 can output an evaluation about incompletion of the source code files stored in the source code storage 50. Specifically, the output module 80 can output incompletion-indicating evaluation values determined by the evaluation module 70. For example, the output module 80 can output correspondences between the source code files stored in the source code storage 50 and the attention comments in the source code files by arranging the correspondences in descending order of incompletion-indicating evaluation values calculated by the evaluation module 70. Alternatively, the attention comments included in the correspondences can be only the candidate comments other than the first incompletion-non-indicating comments. Note that the correspondences serve as one example of the claimed information on evaluation.

Figure 2:
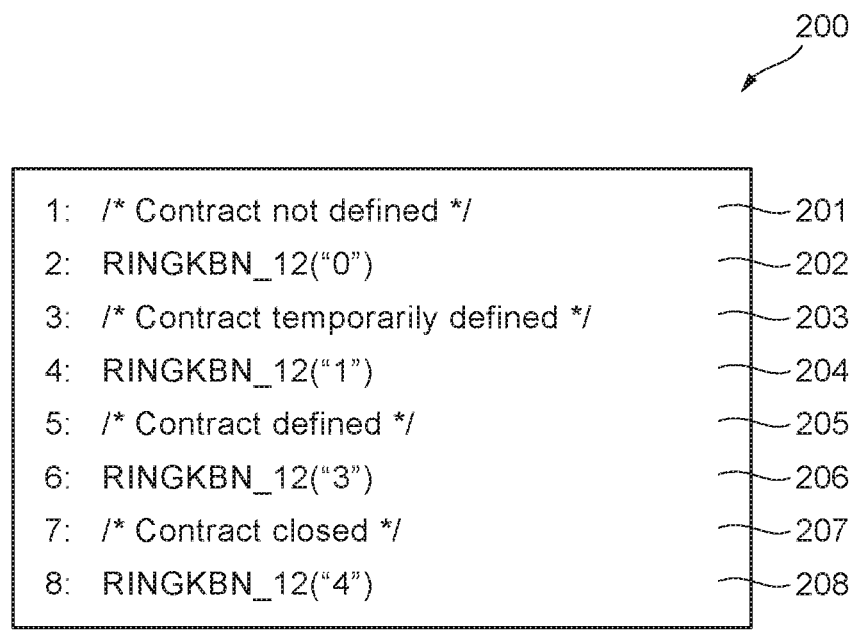
FIG. 2 depicts an example of a source code fragment including the first incompletion-non-indicating comment according to the preferred exemplary embodiment.
Figure 3:
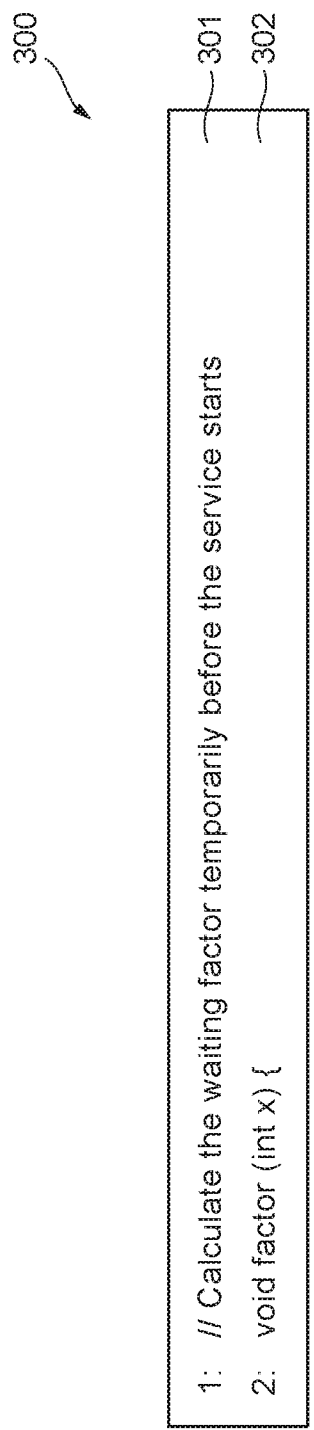
FIG. 3 depicts an example of a source code fragment including the second incompletion-non-indicating comment.
Figure 4:
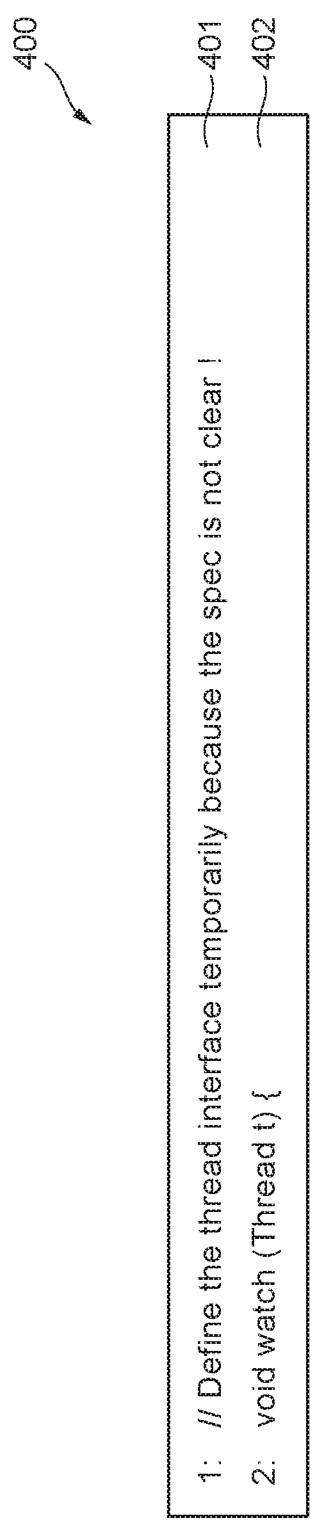
FIG. 4 depicts an example of a source code fragment including an incompletion-indicating comment.

Referring to FIGS. 2 to 4, there are shown examples of source code fragments each including comments processed by the comment processing module 20 or 60 in the preferred exemplary embodiment.

FIG. 2 shows an example of a source code fragment 200 including the first incompletion-non-indicating comment. As shown in the figure, the source code fragment 200 can include comments 201, 203, 205, and 207, and program statements 202, 204, 206, and 208. Character strings each sandwiched between symbols "/*" and "*/" can be detected as the comments, and the other character strings can be detected as the program statements. An attention word "temporarily" is found in the comment 203. The program statement 204 is assumed to be in correspondence with the comment 203. A rule of correspondence between a comment and a program statement (for example, a comment is in correspondence with an immediately following program statement) can be predefined. That is, in FIG. 2, the attention word "temporarily" is used in the comment 203 among the comments 201, 203, 205, and 207 described over plural lines to explain the specifications of the program statements 202, 204, 206, and 208.

Each of the program statements 202 and 206 is adjacent to the program statement 204. The comment processing module 20 or 60 can calculate a similarity between the program statements 202 and 204, and a similarity between program statement 204 and 206. Since five syntax elements "RINGKBN_12", "(",")", "" ", and " "" out of six syntax elements are common both between the program statements 202 and 204, and between the program statements 204 and 206, each of these similarities is 0.83. Assuming that a predefined threshold value is 0.2, the comment processing module 20 or 60 can determine that the comment 203 is the first incompletion-non-indicating comment because either of the similarities is higher than the predefined threshold value. Therefore, the comment processing module 20 can exclude the first incompletion-non-indicating comment from the comments for training, and the comment processing module 60 can exclude the first incompletion-non-indicating comment from the comments to be evaluated.

Note that although the program statements are function call statements in FIG. 2, the program statements can be assignment statements, if statements, or the like.

FIG. 3 shows an example of a source code fragment 300 including the second incompletion-non-indicating comment. As shown in the figure, the source code fragment 300 can include a comment 301 and a program statement 302. Character strings each following a symbol "//" can be detected as comments, and the other character strings can be detected as program statements. An attention word "temporarily" is found in the comment 301. The program statement 302 is assumed to be in correspondence with the comment 301. A rule of correspondence between a comment and a program statement (for example, a comment is in correspondence with an immediately following program statement) can be predefined. That is, in FIG. 3, the attention word "temporarily" is used in the comment 301 described in one line to explain the specification of the program statement 302.

Although not shown, program statements adjacent to the program statement 302 are assumed not to be similar to the program statement 302. In this case, the evaluation module 70 can input words included in the comment 301 into the classification model stored in the classification model storage 40 and thus determine that the comment 301 is unlikely to indicate that the program statement 302 is incomplete. As a result, the evaluation module 70 can determine that the comment 301 is the second incompletion-non-indicating comment.

FIG. 4 shows an example of a source code fragment 400 including the incompletion-indicating comment. As shown in the figure, the source code fragment 400 can include a comment 401 and a program statement 402. Character strings each following a symbol "//" can be detected as comments, and the other character strings can be detected as program statements. An attention word "temporarily" is found in the comment 401. The program statement 402 is assumed to be in correspondence with the comment 401. A rule of correspondence between a comment and a program statement (for example, a comment is in correspondence with an immediately following program statement) can be predefined.

Although not shown, program statements adjacent to the program statement 402 are assumed not to be similar to the program statement 402. In this case, the evaluation module 70 can input words included in the comment 401 into the classification model stored in the classification model storage 40 and thus determine that the comment 401 is highly likely to indicate that the program statement 402 is incomplete. As a result, the evaluation module 70 can determine that the comment 401 is an incompletion-indicating comment.

Figure 5:
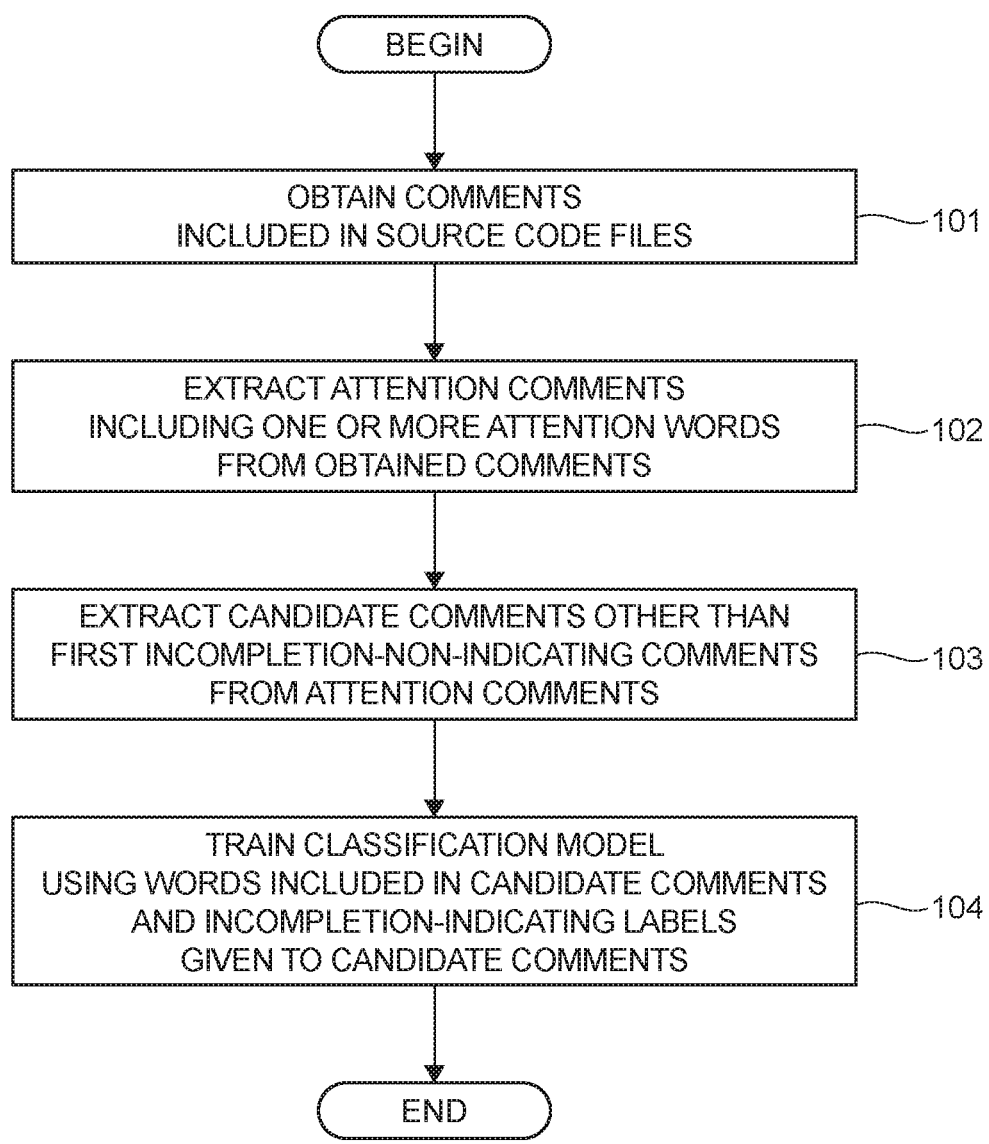
FIG. 5 depicts a flowchart representing an example of a training operation of the software quality analyzing system according to the preferred exemplary embodiment of the present invention.

Referring to FIG. 5, there is shown a flowchart representing an example of a training operation of the software quality analyzing system 1 (shown in FIG. 1) according to an embodiment.

As shown in FIG. 5 (referencing FIG. 1 as well), the comment processing module 20 can obtain the comments included in the source code files for training stored in the source code storage 10 (block 101). Next, the comment processing module 20 can extract the attention comments including at least one of the attention words stored in the attention word storage 5 from the comments obtained at block 101 (block 102). Subsequently, the comment processing module 20 can extract the candidate comments other than the first incompletion-non-indicating comments from the attention comments extracted at block 102 (block 103).

After that, the training module 30 can train the classification model using words included in the candidate comments extracted at block 103 and the incompletion-indicating labels given to the candidate comments (block 104). The classification model trained at block 104 can be stored in the classification model storage 40.

Figure 6:
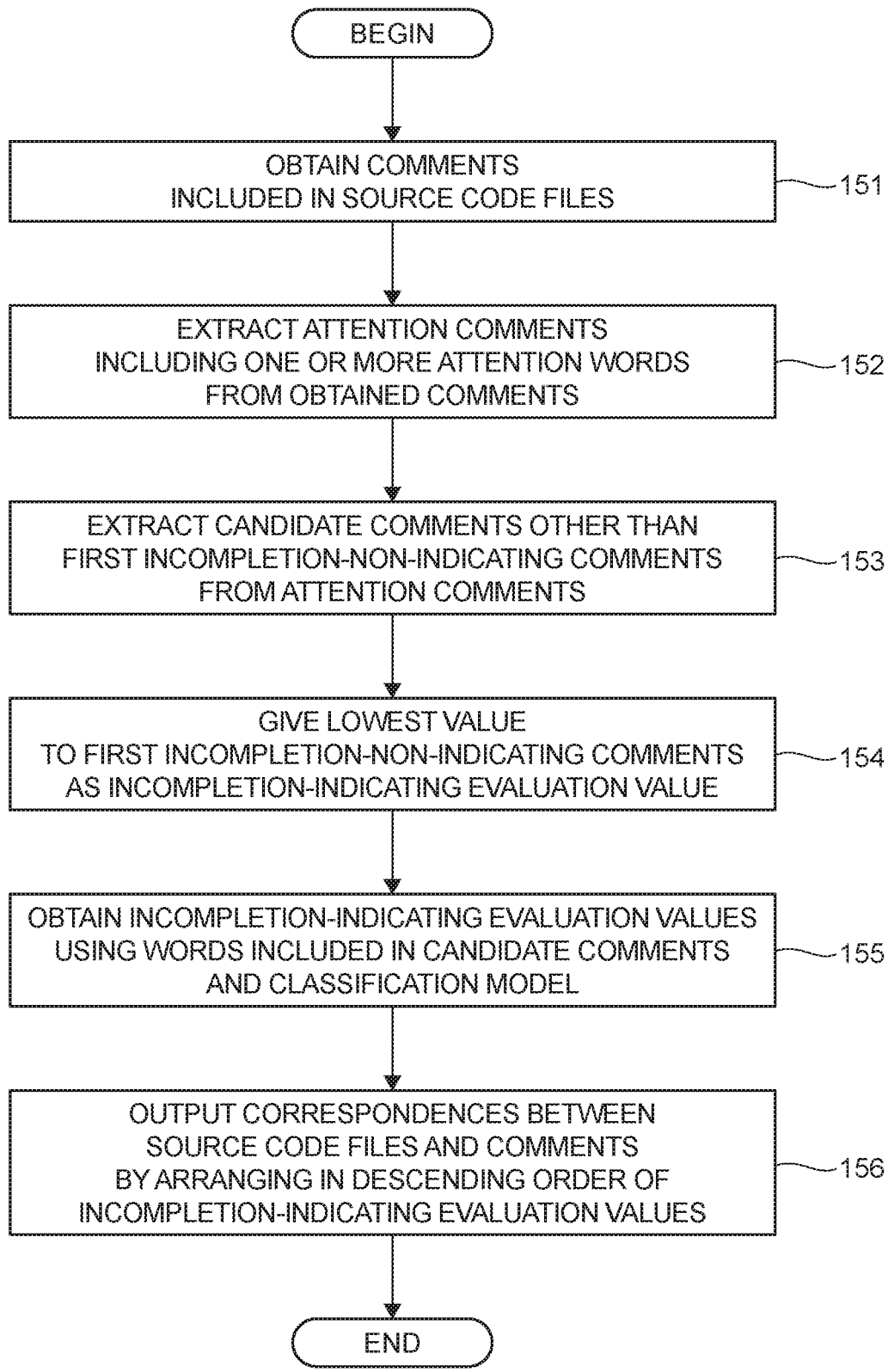
FIG. 6 depicts a flowchart representing an example of an evaluation operation of the software quality analyzing system according to the preferred exemplary embodiment of the present invention.

Referring to FIG. 6, there is shown a flowchart representing an example of an evaluation operation of the software quality analyzing system 1 according to the preferred exemplary embodiment.

As shown in FIG. 6 (referencing FIG. 1 as well), the comment processing module 60 can obtain the comments included in the source code files to be evaluated stored in the source code storage 50 (block 151). Next, the comment processing module 60 can extract the attention comments including at least one of the attention words stored in the attention word storage 5 from the comments obtained at block 151 (block 152). Subsequently, the comment processing module 60 can extract the candidate comments other than the first incompletion-non-indicating comments from the attention comments extracted at block 152 (block 153).

After that, the evaluation module 70 can give the lowest value to the first incompletion-non-indicating comments excluded at block 153 as the incompletion-indicating evaluation value (block 154). Meanwhile, the evaluation module 70 can determine the incompletion-indicating evaluation values using words included in the candidate comments extracted at block 153 and the classification model stored in the classification model storage 40 (block 155).

The output module 80 can output correspondences between the source code files stored in the source code storage 50 and the attention comments in the source code files by arranging the correspondences in descending order of the incompletion-indicating evaluation values obtained at block 155 (block 156).

Note that if the attention comments included in the correspondences are the candidate comments other than the first incompletion-non-indicating comments, block 154 can be removed.

Next, another embodiment will be described. The block diagram of the software quality analyzing system 1 according to the present embodiment is the same as the block diagram of the software quality analyzing system 1 according to the previously described embodiment. However, since functions of the comment processing module 20 or 60 according to the present embodiment and the previously described embodiment are partially different, only the comment processing module 20 or 60 will be described below.

In the previously described embodiment, the comment processing module 20 or 60 identifies, in the third comment processing, each of the first incompletion-non-indicating comments based on a similarity between a source code fragment related to any of the attention comments and an adjacent source code fragment adjacent to the source code fragment, however identifying the first incompletion-non-indicating comments is not limited to this method. In the present embodiment, the comment processing module 20 or 60 can identify each of the first incompletion-non-indicating comments based on a type of the source code fragment including any of the attention comments. The type of the source code fragment can include a change log, a fixed header, a copyright, or the like. The type of the source code fragment can be determined by detecting a keyword indicating a change log, a fixed header, a copyright, or the like, as described below.

Figure 7:
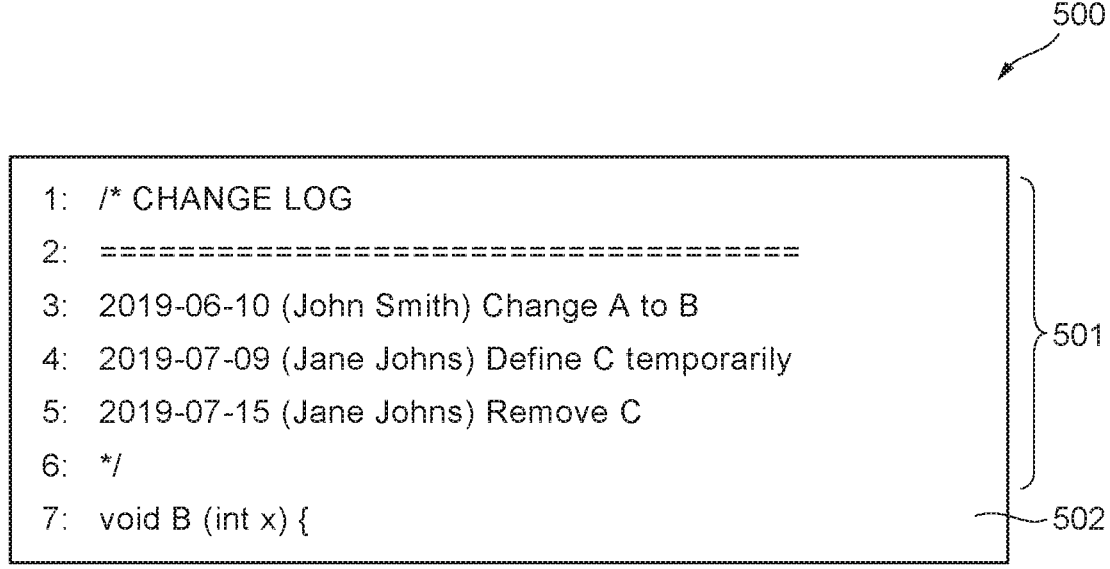
FIG. 7 depicts an example of a source code fragment including the first incompletion-non-indicating comment according to an alternative exemplary embodiment.

Referring to FIG. 7, there is shown an example of a source code fragment including a comment processed by the comment processing module 20 or 60 in the alternative exemplary embodiment.

FIG. 7 shows an example of a source code fragment 500 including the first incompletion-non-indicating comment. As shown in the figure, the source code fragment 500 can include comments 501 and program statements 502. Character strings each sandwiched between symbols "/*" and "*/" can be detected as the comments, and the other character strings can be detected as the program statements. An attention word "temporarily" is found in the fourth line of the comment 501.

Since a phrase "CHANGE LOG" on the first line of the comment 501 indicates that the source code fragment 500 is an area where a change log is described, the comment processing module 20 or 60 can determine that the comment 501 is the first incompletion-non-indicating comment. Therefore, the comment processing module 20 can exclude the first incompletion-non-indicating comment from the comments for training, and the comment processing module 60 can exclude the first incompletion-non-indicating comment from the comments to be evaluated.

The training operation of the software quality analyzing system 1, according to the present embodiment, is the same as the training operation of the software quality analyzing system 1, according to the previously described embodiment, except that, at block 103 of FIG. 5, the comment processing module 20 identifies the first incompletion-non-indicating comments further based on the type of the source code fragment. The evaluation operation of the software quality analyzing system 1, according to the present embodiment, is the same as the evaluation operation of the software quality analyzing system 1, according to the previously described embodiment, except that, at block 153 of FIG. 6, the comment processing module 60 identifies the first incompletion-non-indicating comments further based on the type of the source code fragment. Note that the first incompletion-non-indicating comments in the present embodiment serve as one example of the claimed other specific comments.

Figure 8:
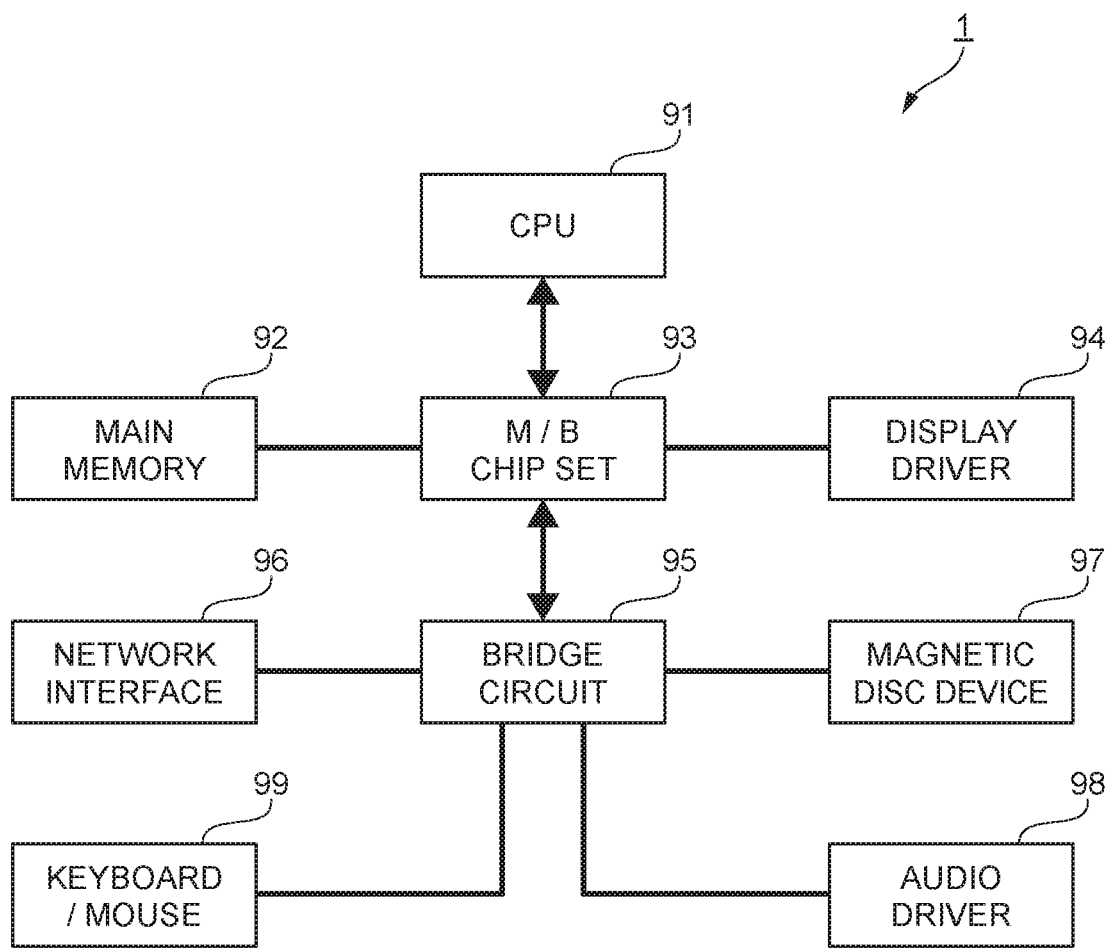
FIG. 8 depicts an example of a hardware configuration of the software quality analyzing system according to exemplary embodiments of the present invention.

Referring to FIG. 8, there is shown an example of a hardware configuration of the software quality analyzing system 1 (shown in FIG. 1) in accordance with embodiments of the present invention. As shown in FIG. 8, the software quality analyzing system 1 can include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 8, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 can be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express can be used for the connection, for example. For connecting the magnetic disk device 97 to the bridge circuit 95, a serial AT attachment (ATA), a parallel-transmission ATA, or peripheral components interconnect (PCI) can be used. For connecting the keyboard/mouse 99 to the bridge circuit 95, a universal serial bus (USB) can be used.

The source code storage 10 and source code storage 50, shown in FIG. 1 can be implemented the magnetic disc device 97, for example. In other embodiments, the source code storage 10 and source code storage 50 can be implemented on storage devices in communication with the software quality analyzing system 1 by way of the network interface 96. In this embodiment, the source code storage 10 and source code storage 50 can be located in a remote server or distributed in a cloud-based storage system.

Additionally, the CPU 91, main memory 92, and the magnetic disc device 97, for example, can interact, responsive to computer-executable instructions, with one another to provide the functionality of the comment processing module 20, the training module 30, comment processing module 60 and evaluation module 70, shown in FIG. 1. Also, the output module 80 of FIG. 1 can be implemented in some embodiments by a combination of the CPU 91 and the display driver 94 to provide a visual representation of the output to a user.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for quality analysis of a source code, the method comprising:
    obtaining a plurality of comments included in the source code, each of the plurality of comments including at least one of a plurality of predetermined words;
    extracting, using machine learning, a plurality of candidate comments which are comments obtained by excluding a plurality of specific comments from the plurality of comments, each of the plurality of specific comments being identified using a similarity between a source code fragment relating to any of the plurality of comments and an adjacent source code fragment adjacent to the source code fragment;
    training a deep neural network (DNN) as a classifier to learn a relationship between an appearance tendency of words included in a comment and whether or not the comment indicates that a corresponding program statement is incomplete; and
    outputting an evaluation about incompletion of the source code, the evaluation being determined using the classifier and the plurality of candidate comments.

2. The computer-implemented method of claim 1, wherein the source code fragment is one of the plurality of comments.

3. The computer-implemented method of claim 1, wherein the source code fragment is a program statement corresponding to one of the plurality of comments.

4. The computer-implemented method of claim 1, wherein the plurality of candidate comments are comments obtained by further excluding a plurality of other specific comments from the plurality of comments, each of the plurality of other specific comments being identified using a type of a source code fragment including any of the plurality of comments.

5. The computer-implemented method of claim 1, further comprising:
    training the classifier to learn the relationship using words included in the plurality of candidate comments and a plurality of labels given to the plurality of candidate comments, each of the plurality of labels indicating whether or not a corresponding candidate comment indicates that a corresponding program statement is incomplete.

6. The computer-implemented method of claim 1, wherein outputting the evaluation includes arranging correspondences between each source code fragment and the respective candidate comment in descending order of incompletion-indicating evaluation values assigned to each source code fragment.

7. An apparatus for quality analysis of a source code, the apparatus comprising:
a processor; and
a memory coupled to the processor, wherein
the memory tangibly stores program instructions executable by the processor to cause the processor to perform a method comprising:
obtaining a plurality of comments included in the source code ach of the plurality of comments including at least one of a plurality of predetermined words;
extracting, using machine learning, a plurality of candidate comments which are comments obtained by excluding a plurality of specific comments from the obtained plurality of comments, each of the plurality of specific comments being identified using a similarity between a source code fragment relating to any of the obtained plurality of comments and an adjacent source code fragment adjacent to the source code fragment;
training a deep neural network (DNN) as a classifier to learn a relationship between an appearance tendency of words included in a comment and whether or not the comment indicates that a corresponding program statement is incomplete; and
outputting an evaluation about incompletion of the source code, the evaluation being determined using the classifier and the plurality of candidate comments.

8. The apparatus of claim 7, wherein the source code fragment is one of the obtained plurality of comments.

9. The apparatus of claim 7, wherein the source code fragment is a program statement corresponding to one of the obtained plurality of comments.

10. The apparatus of claim 7, wherein the plurality of candidate comments are comments obtained by further excluding a plurality of other specific comments from the obtained plurality of comments, each of the plurality of other specific comments being identified using a type of a source code fragment including any of the obtained plurality of comments.

11. The apparatus of claim 7, wherein the method further comprises:
training the classifier to learn the relationship using words included in the plurality of candidate comments and a plurality of labels given to the plurality of candidate comments, each of the plurality of labels indicating whether or not a corresponding candidate comment indicates that a corresponding program statement is incomplete.

12. A computer program product for quality analysis of a source code, the computer program product comprising a computer readable storage medium having program instructions embodied therewith, the program instructions executable by a computer to cause the computer to perform a method comprising:
obtaining a plurality of comments included in the source code, each of the plurality of comments including at least one of a plurality of predetermined words;
extracting a plurality of candidate comments using machine learning, the comments being obtained by excluding a plurality of specific comments from the obtained plurality of comments, each of the plurality of specific comments being identified using a similarity between a source code fragment relating to any of the obtained plurality of comments and an adjacent source code fragment adjacent to the source code fragment; and
training a deep neural network (DNN) as a classifier to learn a relationship between an appearance tendency of words included in a comment and whether or not the comment indicates that a corresponding program statement is incomplete;
outputting an evaluation about incompletion of the source code, the evaluation being determined using the classifier and the plurality of candidate comments.

13. The computer program product of claim 12, wherein the source code fragment is one of the obtained plurality of comments.

14. The computer program product of claim 12, wherein the source code fragment is a program statement corresponding to one of the obtained plurality of comments.

15. The computer program product of claim 12, wherein the plurality of candidate comments are comments obtained by further excluding a plurality of other specific comments from the obtained plurality of comments, each of the plurality of other specific comments being identified using a type of a source code fragment including any of the obtained plurality of comments.

16. The computer program product of claim 12, wherein the method further comprises:
training the classifier to learn the relationship using words included in the plurality of candidate comments and a plurality of labels given to the plurality of candidate comments, each of the plurality of labels indicating whether or not a corresponding candidate comment indicates that a corresponding program statement is incomplete.

17. The computer program product of claim 12, wherein outputting the evaluation includes arranging correspondences between each source code fragment and the respective candidate comment in descending order of incompletion-indicating evaluation values assigned to each source code fragment.

* * * * *